(12) United States Patent
Cohen et al.

(10) Patent No.: US 7,783,526 B1
(45) Date of Patent: Aug. 24, 2010

(54) UNREGISTERED AUCTION DEVICE AND METHOD UTILIZING PHONE SERVICE PLANS

(75) Inventors: Meir S Cohen, Toms River, NJ (US); Eli Finkelman, Toms River, NJ (US)

(73) Assignee: iSeeMe Marketing, inc., Toms River, NJ (US)

( * ) Notice: Subject to any disclaimer, the term of this patent is extended or adjusted under 35 U.S.C. 154(b) by 0 days.

(21) Appl. No.: 12/552,727

(22) Filed: Sep. 2, 2009

(51) Int. Cl.
*G06Q 30/00* (2006.01)
(52) U.S. Cl. ............................................. 705/26
(58) Field of Classification Search ................ 705/26, 705/27, 37
See application file for complete search history.

(56) References Cited

U.S. PATENT DOCUMENTS

2005/0086164 A1* 4/2005 Kim et al. ..................... 705/40

* cited by examiner

*Primary Examiner*—Mila Airapetian
(74) *Attorney, Agent, or Firm*—Michael J. Feigin, Esq.; http://PatentLawNY.com

(57) ABSTRACT

Embodiments of the disclosed technology, by way of a bidirectional transceiver, allow a user of a handheld device with phone and/or data service to place a bid in an auction for an item, whereby the user is charged for the bid, and both a phone service provider and auction provider receive at least a part of the proceeds. In this manner, unregistered (previously unknown to the auction provider) bids may be placed, with security on the part of the auction provider that the bid will be honored.

20 Claims, 5 Drawing Sheets

UNREGISTERED AUCTION DEVICE AND METHOD UTILIZING PHONE SERVICE PLANS

FIELD OF THE DISCLOSED TECHNOLOGY

The disclosed technology relates generally to auction methods and, more specifically, to auction methods and devices with unknown users and further, electronic auction methods and devices.

BACKGROUND OF THE DISCLOSED TECHNOLOGY

Traditional auctions have long been known in the art. Such auctions take place by offering an item for sale whereupon those in the crowd take turns making a bid. As each bid is made, the next bidder must offer at least an incrementally higher bid in order for his new bid to be accepted. Once a bid is accepted, it is usually considered binding on the bidder and auction provider.

While this traditional method has uses and may even be enjoyable, it also has limitations. For instance, a bidder must pre-register with the auction provider and place some sort of collateral or down payment with the provider to ensure that the bids will be honored. Disclosures of personal information that might dissuade bidders from placing a bid must also be provided at least to the auction provider, if not to the other participants and the public at large. A bidder must also become an active participant or "seek out" the auction; e.g. the bidder must pre-register, be at a specific location at a specific time to witness the auction process, and so forth. A casual observer cannot simply be walking by an auction and make a bid (unless the auction provider is willing to accept a substantial amount of unfulfilled bids by anonymous parties). Further, the auction provider only receives payment for the highest bid in such a traditional auction.

Online auctions, such as are well known in the art (e.g., U.S. Pat. No. 7,162,446 and hereby incorporated by reference, and the ebay.com, bidz.com, and swoopo.com references which are provided in the Information Disclosure Statement for the U.S. version of this application) are auctions which take place at all hours and allow a bidder to "enter" and "leave" an auction at the bidder's own convenience. Still, however, these online auctions have failed to solve the problem of pre-registration and anonymity. In fact, in the online world, pre-registration is even more essential, because making a fake bid is even easier in such a setting. In the case of online auctions, bidders can only bid on the product if they register an online account (which is often time-consuming and requires disclosure of one's email account address) and disclose billing information (e.g., mailing address, credit card information, etc.) to the online auction provider. Still further, such online auctions are largely limited to the website of the auction provider and are not easily transferable to a physical auction setting, as the users must be well-versed in computer-based methods of registration, payment, and so forth, as well as use the proprietary features of each bidding website.

Furthermore, traditional and online auctions are both inconsistent with an economy that is often regarded as based on instant consumer gratification. When consumers see an item that they desire, they want to purchase the item at that moment. An auction setting simply does not allow for this, and thus a great deal of auction commerce is lost.

There is a need in the art to provide auctions which are convenient, safe, allow for instant gratification of the bidder (an "impulse buy"), and do not require pre-registration. Such an auction would allow for the benefits of auctions while decreasing the negative aspects thereof.

SUMMARY OF THE DISCLOSED TECHNOLOGY

It is therefore an object of the disclosed technology to increase auction commerce by providing a method and device for allowing people to bid at an auction instantly, conveniently, and safely with a handheld wireless device.

In an embodiment of the disclosed technology, a device for providing a phone and data service uses a bidirectional transceiver that provides phone and data service to a handheld device. Billing means are employed to charge the user for phone and data service. Such billing means may be phone billing systems which are widely known in the art (e.g., sending a customer an invoice, receiving payment by check or credit card, and devices which handle same) for charging the user of the device for the phone and data service. By way of the transceiver, a user bid is received for an item exhibited by an auction provider. The billing means are then employed to charge the user for bid placement, and a portion of such charge is forwarded to the auction provider. A bid may be placed for an item by means of the user's handheld device (such as a premium short message service, an interactive voice response system, or the like).

The user may be previously unknown to the auction provider. That is, the above device allows a user to make a bid based only on seeing an exhibited product, without prior registration, but with an assurance to the auction provider that the bid will be honored, based on making the funds available or set aside, or by receiving (implicitly or explicitly) the assurance of a third party, such as the phone service plan provider, that the bid will be honored.

A first user may place a bid using an interactive voice system, while a second, third, fourth (and so on) user may place a bid using the transceiver, where such a user uses a short messaging service to place the bid. Upon receiving the highest bid (e.g., the winning bid or last applied bid before the auction ends), the billing means are used to charge a user placing this bid for at least an amount of the bid. Billing information may be received by the transceiver, enabling the user with the highest bid to pay the bid amount.

The auction may be provided on a public video display and a video of a viewing location thereof may be exhibited with the item for sale (auction). A picture of a highest bidder may be exhibited with the item.

A method for an auction provider to auction an item is also disclosed and claimed. The method proceeds by first exhibiting an item for sale and then receiving a plurality of electronic bids for the item from a plurality of handheld wireless devices. Each handheld wireless device is associated with a phone service plan of a user, and at least some of the users are previously unknown to the auction provider. A predetermined payment for each bid placed is received by the phone service plan provider (and/or the auction provider). The payment is charged by a provider of the phone service plan. Delivery of the item for auction is directed to the user upon the user's winning the auction.

The auction provider may receive a bid placed by a user by way of premium short messaging service or interactive voice response system. A bid from a first user may be via the premium short messaging service, while a bid from a second user may be via the interactive voice response system. The winning bidder is charged, by way of the billing means, for at least an amount of said bid. Billing information may be received by way of a handheld wireless device used to place a bid, so as to bill via traditional means (e.g., check, credit card, bank wire transfer, internet payment system) or via a charge placed by the phone service plan provider using the payment means or otherwise paying for the phone and/or data service.

Likewise, the features of the device described above may be applied to the method of the disclosed technology.

DETAILED DESCRIPTION OF EMBODIMENTS OF THE DISCLOSED TECHNOLOGY

Figure 1:
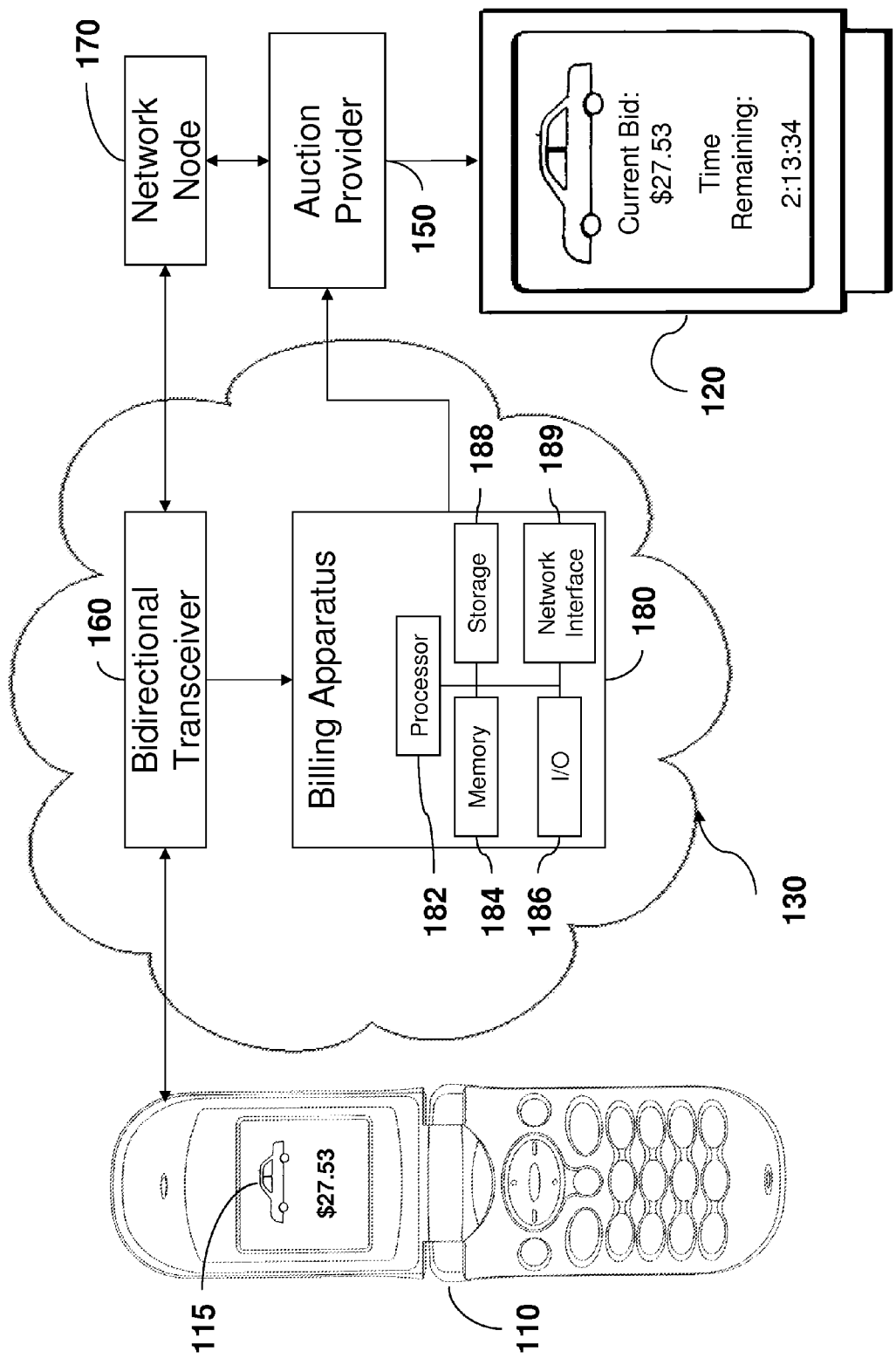
FIG. 1 shows a high level diagram of devices used to send and receive bids in auctions in embodiments of the disclosed technology.

Embodiments of the disclosed technology, by way of a bidirectional transceiver, allow a user of a handheld device with phone and/or data service to place a bid in an auction for an item, whereby the user is charged for the bid, and both a phone service provider and auction provider receive at least a part of the proceeds. In this manner, unregistered (previously unknown to the auction provider) bids may be placed with security on the part of the auction provider that the bid will be honored.

More specifically, embodiments of the disclosed technology comprise methods and devices for an auction provider (where an auction provider is defined as a human vendor, a electronic device, or a combination thereof) to provide consumers with the capability to place bids on an auctioned item (e.g., consumer products, professional services, vacations, etc.) by way of a handheld device (e.g., a phone, a networked media player, a personal digital assistant and the like) with an associated phone and data service provider. The auction provider may exhibit an item for sale to the public, by way of a video display screen. In embodiments, the auction provider may further or instead be a live auction with an auctioneer, and/or may be exhibited on a networked console, a public display, a handheld device, or the like. In an embodiment of the disclosed technology, a user of a handheld device is previously unknown to the auction provider.

A device of the disclosed technology comprises a bidirectional transceiver (e.g., cellular tower, 802.11 WiFi network, network node capable of transmission via wired or wireless communication, or the like) which provides phone and data service to a handheld device. Billing means for charging a user of the handheld device for data and phone services are also employed, the billing means being a method or devices used by a provider of the phone service to charge a user for services (e.g., a periodic bill sent to a user's address payment of which is transmitted by a certain date, an automatic charge withdrawing payment from a user's financial account or placed on a user's credit card, and the like).

An auction is complete when the desired bidding amount is received, a certain amount of time has elapsed, or no higher bids are being received within a certain amount of time. When an auction is completed, in one embodiment, the service provider charges the highest bidder for the bidding amount, or a higher amount, for instance including other fees such as shipping, handling, processing, and so forth. A portion or all of such a charge for the bid amount and fees, (e.g., bid placement, shipping, services, etc.) along with information regarding the highest bidder is then relayed to the auction provider. Furthermore, the auction provider directs the auctioned item to the highest bidder). In another embodiment, during the bidding process, a user is required to enter payment information (e.g., credit card, bank wire, or internet-based money account information) before the auction ends.

The disclosed technology will become clearer in light of the description of the figures.

FIG. 1 shows a high level diagram of devices used to send and receive bids in auctions in embodiments of the disclosed technology. Such a device may be a handheld (wireless) device controlled by a user placing bids in auction. The device, as noted above, may be a cellular phone, personal digital assistant, media player, or the like, with network connectivity, such as phone and data (e.g., internet) service. The data service may also be or comprise SMS (short messaging service) or premium SMS service.

A user of a handheld device 110 views an item for auction 115. While the item for auction is shown on a screen of the handheld device, in FIG. 1, the auction may be shown in addition, or only on a public video display 120 and/or a user's home computer, where bids received over a computer network such as the internet are also employed. Such a public video display 120 may be in a heavily trafficked area (e.g., a city center such as Times Square) and other places where the auctioned item is viewable by potential bidders.

The handheld device 110 exchanges data with a network 130 which comprises at least a form of phone and data service (described above) which is transmitted to the handheld device via a bidirectional transceiver 160 (e.g., a cellular tower, 802.11 Wifi access point, satellite, and so forth).

The bidirectional transceiver 160 receives from the wireless device 110 a bid to a network node 170. From there, the bid is forwarded to an auction provider 150. When the bid is received, as noted above, the user is charged for placement of the bid by the service provider by way of a billing apparatus 180 (expounded in greater detail below). A portion of the proceeds of the charge for the bid placement may be passed on to the auction provider 150 at this time or at a later time. In either case, information about the bid itself is passed on to the auction provider 150 by way of the network node 170, which is a point on a data network between the bidirectional transceiver 160 and auction provider 150 and may reside at a physical location of the phone service provider, auction provider, or at a transmission point in between. It may be, for example, a router.

The public video display 120, also described above, may refer to a live auctioneer (human), electronic display, or an electronic display showing a live auctioneer, e.g., any form of product exhibition. The public video display 120 shows information about a current item or items being auctioned with real time information or near-real time (meaning, as quickly as can be updated by devices used to carry out the disclosed technology) regarding current bids that the auction provider receives via the network node 170. Examples of information exhibited include, but are not limited to, visual and verbal representation of an auctioned item, a location for viewing the public video display, the current price of the auction item, the current price to place a bid, time left until no more bids are accepted, amount of bids taken, and the like. Additionally, a video feed of a bidding location (e.g., a place where such a video display 120 is viewable, such as in front of a video display screen 120 located at a public square) may be displayed on the video screen, as may be a picture of the current highest bidder by way of a previously provided picture or geo-location to provide a picture of the user via the video feed.

The billing apparatus 180 is a device which may be used as billing means. This may be a device known in the art to charge a user for a phone and/or data service plan associated with a handheld device. For example, the billing means may function by sending an invoice to a user for phone and/or data service and receiving a payment back from the user. Such a payment for phone and/or data service may also be made by an automated method, such as credit cards or bank wire transfers. In an embodiment thereof, a billing apparatus 180 comprises a processor 182, memory 184, input/output 186, storage 188, and a network interface 189. These features correspond to those described in further detail below with regard to FIG. 5 and the description thereof, below. The billing apparatus 180 is used to charge the user for bid placement. In the embodiment shown in FIG. 1, when a user places a bid passing through the bidirectional transceiver 160, the user is charged for bid placement by way of the billing apparatus 180, and a portion of that charge is forwarded to the auction provider 150.

It should be further understood that one or more intermediaries may operate, jointly or separately, devices shown in FIG. 1. For example, an intermediary provider may be used to process payments from a user associated with a handheld device to a phone service provider, and one or more intermediaries may be used to process payments from a phone service provider to an auction provider. In this manner, an auction provider need not necessarily have a contract to accept payments with every phone service plan provider, but may contract to process payments with a third party intermediary having the ability to pass on charges to a user for bids placed.

Figure 2:
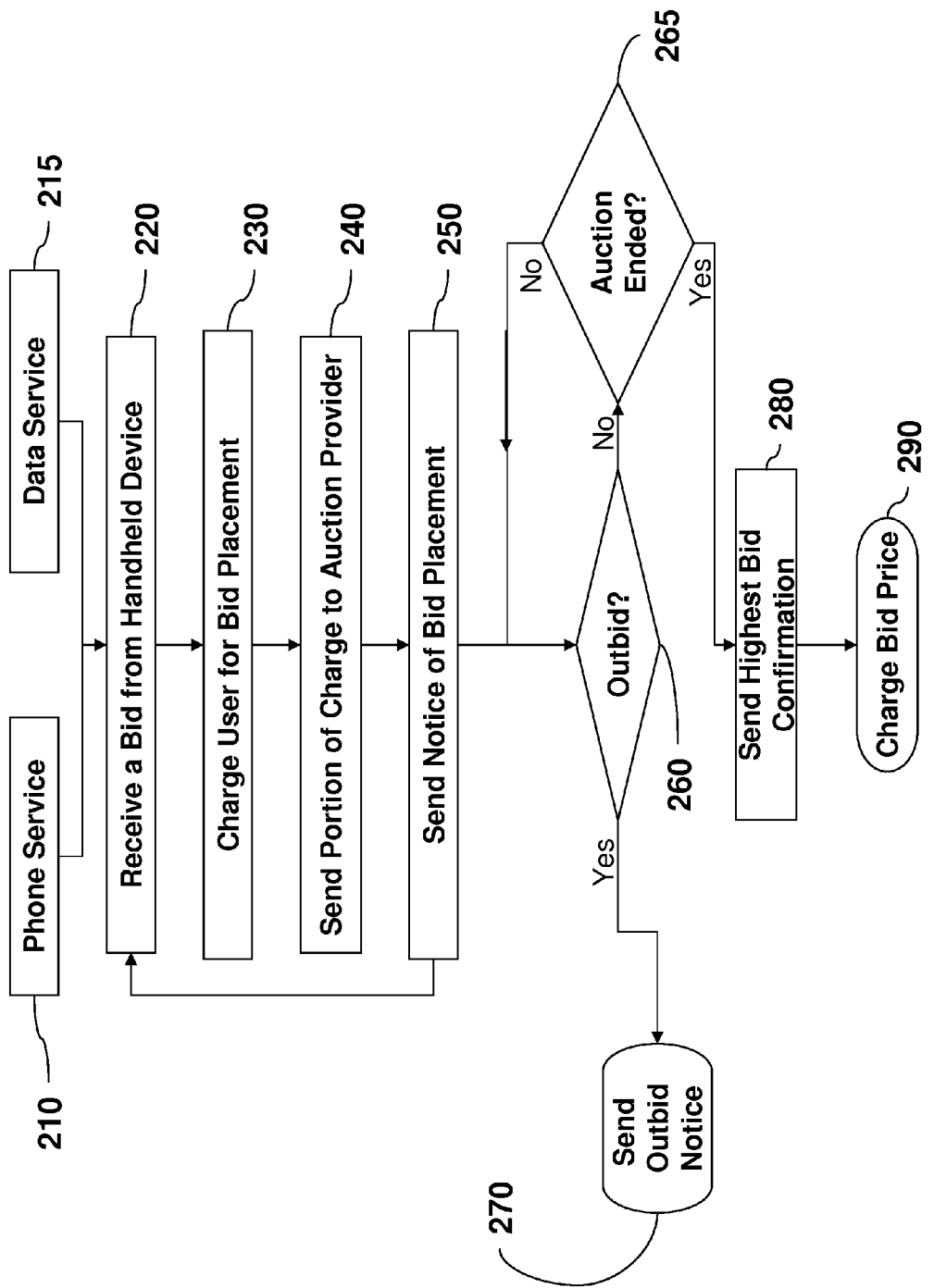
FIG. 2 shows steps carried out by a phone service provider to facilitate an auction in embodiments of the disclosed technology.

FIG. 2 shows steps carried out by a phone service provider to facilitate an auction in embodiments of the disclosed technology. The phone service provider supplies a user's handheld device with phone service 210 (which is defined as telephonic communication via the bidirectional transceiver) and/or data service 215 (which is defined as packet switched communication, binary or ASCII transfer of information, or the like, including what is commonly referred to as "internet access," "SMS messaging," and the like).

In step 220, a bid is received from the handheld device of the user, such as by way of the bidirectional transceiver 160 of FIG. 1. Premium short messaging service and/or use of an interactive voice response system may be employed to receive the bid. Then, in step 230, the phone service provider (directly or by way of an intermediary, described above) charges the user for the bid placement by use of billing means. This step may be accomplished when a phone service provider charges a user by way of billing means for a bid placement which is either directly added to a user's current account for his or her phone service plan, or the user is charged separately by way of means known in the art, such as credit card payment, online money account debiting, direct debit from a bank account, a prepaid phone/data service card, or the like. The cost of bid placement either remains constant for the duration of an auction, or it may vary depending on a variety of factors including the time, current bidding price, number of bids placed on an item, bids placed by user, and so forth.

Still referring to FIG. 2, in step 240, at a time after charging a user for the bid placement (which may be before any payment is received), the phone service provider sends a portion of the charge for the bid placement to the auction provider (e.g., auction provider 150 shown in FIG. 1). The portion of the bid placement charge sent to the auction provider may be any portion thereof, such as 10 percent, 25 percent, 50 percent, 75 percent, or 100 percent of the charge received from the user for bid placement in step 230.

In step 250, at any time after the bid is received in step 220, the phone service provider sends a notice of the bid placement to the auction provider and/or the user. The notice of the bid placement includes, but is not limited to, information pertaining to a proof of purchase, bid history of the user, the amount charged for bid placement/amount paid to the auction provider for the bid, the amount of the bid, a timestamp of when the bid was placed or received, or a combination thereof. When the notice is sent to the user, it may be in the form of a return SMS message, voice confirmation or the like, and may comprise any of the above information, and in addition, data regarding acceptance of the bid, time left in the auction, and so forth.

The user's bid received in step 220, as should be understood, is only accepted if the bid amount is higher than the present/most recently accepted bid. In embodiments of the disclosed technology, a bid placed will automatically be deemed to be a set amount higher than the present highest bid. For example, if the present auction price for a home theater is $33, then the next bid placed will be $34. Once the bid amount reaches $100, then the bids may be incremented by $5 at a time. Thus, as the magnitude of the present highest bid rises, the bid increment amount may be increased. In this manner, bidding is fast paced and easy to carry out, as little input on the part of bidders is required. In other embodiments, a bid amount must be entered for each bid. Combinations of various methods may also be employed, whereby bid amounts may be auto-incremented or entered by a bidder.

Based on such, in step 260, as long as the auction has not ended in step 265 (e.g., time has not elapsed or a desired bid has not yet been received), it is determined whether a current highest bidder/a current high bid has been outbid. Being outbid is defined as the successful acceptance of a bid comprising a bid amount of higher monetary value than the current high bid for an auctioned item or service. Typically, in an auction, many bids are placed, so step 270 is carried out frequently where a notice that a user is outbid is exhibited to the user (such as by exhibiting same on a display device such as display device 120, notifying the user by SMS messaging, by an automated phone call, interactive voice response system, or other means described above or below). This notification includes information relaying to a user that his or her bid is no longer the highest bid and thus will not be accepted to win the auction, such as a notice of the acceptance of a higher bid of a second user. The outbid notice in step 270 may be as a result of receiving/accepting another bid in a second carrying out of steps 220-260 from another user. The outbid user may choose to send another bid which is received in step 220, and the process repeats itself.

For example, a first user places a bid of $10 for a hockey stick in step 220, and the steps of FIG. 2 are carried out until step 260, after which steps 260 and 265 are repeated until the auction has ended or a new, higher bid is received (and accepted). In this example, before the auction ends, a second bid in the amount of $11 is received from a second user, and in step 260, it is determined that the first user has been outbid and step 270 is carried out for the first user (an outbid notice is sent), while the second user is currently holding at steps 260 and 265 which cycle until a higher bid is placed (step 260) or the auction has ended (step 265). The first bidder may decide to place a yet higher bid which is received in step 220, e.g., $12, and the process continues.

After it is determined that the auction has ended (again, due to either an elapsed time, a desired bid amount or total revenue from bid placements is received, or any other reason determined by the auction provider), in step 280 a highest bid confirmation is sent to the user who placed the highest bid by way of any of the means described with reference to step 270. In embodiments of the disclosed technology, any of the following are included in the confirmation in step 280: confirmation of a highest bid, information concerning how to make payment, confirmation of a payment made of at least the amount bid, and either a request for shipping information or information on how to retrieve the item auctioned.

In step 290, the phone service provider charges the user the bid price for the item exhibited by way of the billing means described above and/or the billing apparatus 180 of FIG. 1. In other embodiments, the user with the winning bid pays the bid amount directly to the auction provider or seller of the item. The bid price/amount is all or a portion of the amount of the final bid amount placed by the user. Additional charges may apply comprising any of sales tax, shipping fees, warranty fees, and convenience fees. In further embodiments, the charge for bid placement (step 230) and the charge for the bid price are combined as a single net charge to a user. Furthermore, as was done with the bid placement amount in step 240, a portion or all of the charge of the final bid amount is forwarded to the auction provider. It should be understood that either step 280 or 290 may occur first or the two may occur simultaneously.

Figure 3:
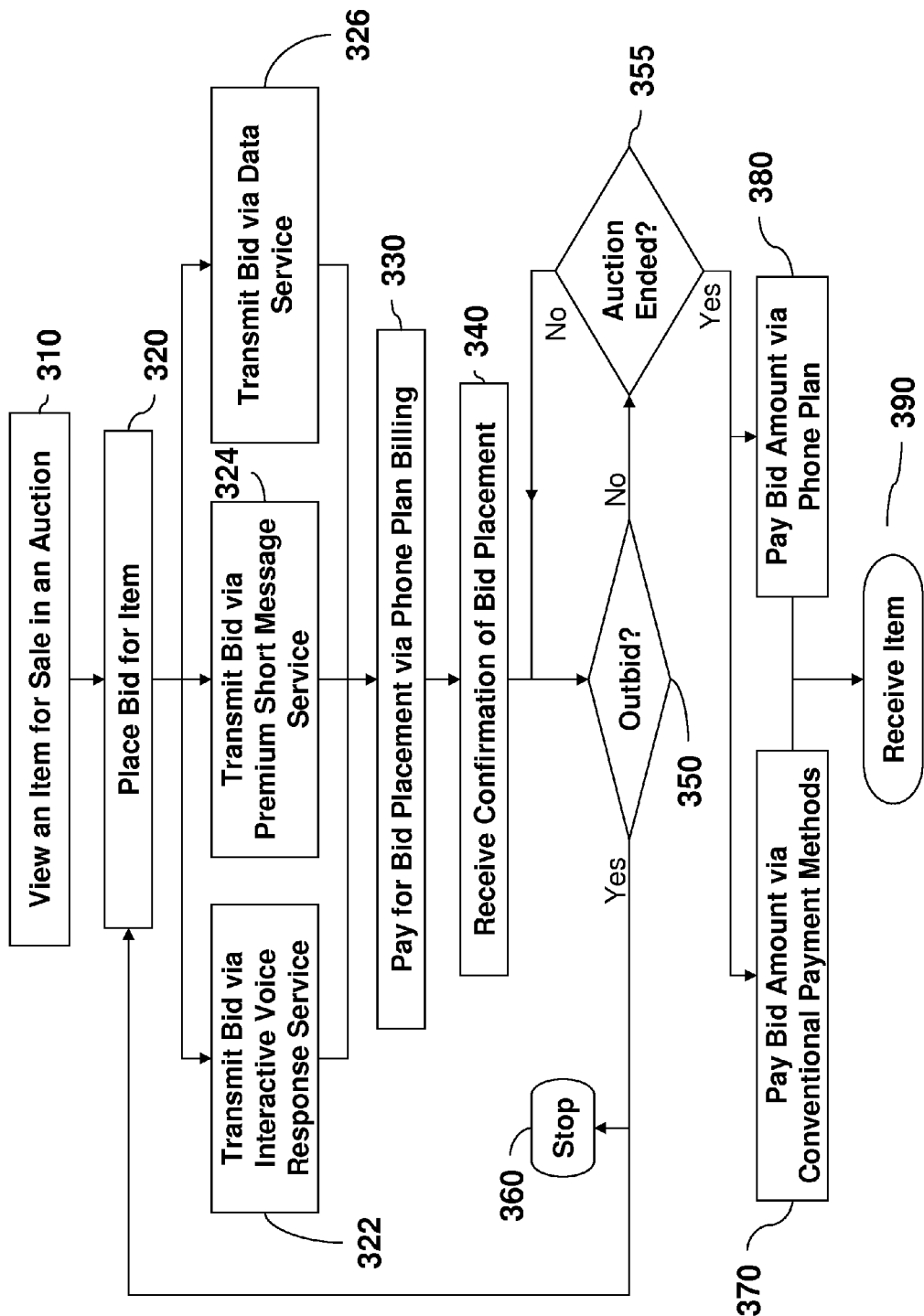
FIG. 3 shows steps carried out by a user in an auction in embodiments of the disclosed technology.

FIG. 3 shows steps carried out by a user in an auction in embodiments of the disclosed technology. In step 310, a user of a handheld device (such as handheld device 110) views an item for sale in an auction (such as on a public video display 120 as described in FIG. 1). In step 320, the user places a bid for an item auctioned. The bid is placed via phone or data connectivity/service provided to a handheld device, such as handheld device 110. The bid may be placed based on transmission via an interactive voice response service in step 322, via premium short message service in step 324, and/or via a short message service in step 326.

In step 330, the user pays for bid placement via phone service plan billing, e.g., the charge for placing the bid is listed on the user's phone bill for phone service (a phone service plan) provided by the provider of the phone service (plan) referred to in step 230 of FIG. 2. In step 340, the bidding user receives confirmation of bid placement, which is the receiving of the notice of bid placement as referred to also in step 250. Confirmation of bid placement may be received from the advertising provider via a public video display 120 and/or the phone service provider on the handheld device 110 via the bidirectional transceiver 160.

In step 350, if the bidding user is outbid (as discussed in FIG. 2), the step 360 may occur, whereby the user chooses not to place any further bid. An outbid user then pays only for placement of each bid made up to this point, but as the bid amount itself has not been accepted, the bidding user does not pay the bid price offered in the auction and does not receive the item for sale. Alternatively, when outbid, the user may decide to place a higher bid at (in a Dutch auction) or above the current bidding price. A user placing a higher bid repeats steps 310-350 or 320-350. Until the auction has ended in step 355, a user may be outbid. Once the auction has ended, no more bids are accepted and the highest bidder wins the auction.

The highest bidder wins the auction, e.g., when the question, "Outbid?" in step 350 is answered by "No," and the response to "Auction Ended?" in step 355 is "Yes." In any order, the user receives the item for sale in step 390 and pays the auction provider (such as auction provider 150 of FIG. 1, or a seller of the item) the bidding price. In step 370, a user pays the bid amount via conventional payment methods, such as paying the auction provider directly by check, cash, credit card, and/or the like. Information necessary for the user to make conventional payments to the auction provider is provided by the auction provider and/or the phone service provider. Additionally or alternatively, in step 380, a user pays the bid amount via a phone service plan, such as the plan provided for by the phone service provider over which the bid was placed in step 330. The billing apparatus 180 shown in FIG. 1 may be used to automatically or manually (requiring user input) charge the user/cause the user to pay the bid amount in either step 370 or 380.

In step 390, the user receives the item that was auctioned. The user receives the item at a predetermined area, such as the user's mailing address, at a designated place of item retrieval, or within a proximal area of the auction displayed. Furthermore, receival of an item may require a user to provide information to the phone service provider or the auction provider, such as an area where the user may be able to receive the item, times available to receive item, and the like. A user may receive further information necessary to take possession of the item.

In an example of an embodiment shown and described with respect to FIG. 3, a woman walking through Times Square in New York, N.Y., views, in step 310, a video display 120 showing a car for auction with a current highest offer of $2,000. The woman then, in step 320, places a bid for the car by following the on-screen instructions on the video display 120 by sending a premium SMS text message in step 324 to a certain number and is charged 99 cents to place the bid. Her bid amount is now $2,001. A confirmation, in the form of a return SMS message is sent to her cellular phone and received in step 340. In step 350, it is determined whether she has been outbid and the answer is "No." This is repeated until, in step 355, it is determined that the auction has ended. She is informed via her cellular phone from her phone service provider of a phone number associated with the auction provider that she needs to contact in order to receive the car, and her phone service provider, by way of an intermediary payment agent used by the auction provider 150 is charged with the amount of $2,001 (plus the 99 cents already paid to bid). The woman then contacts the auction provider by phone, payment is confirmed, and, based on her mailing address, the auction provider informs her of a car dealership within walking distance to her house where, in several weeks, she will be able to receive the car. In this manner, the auction provider has actually received up to about $4,000 for the car based on the winning bid and bid placement charges and the woman has only paid a total of $2,001.99. Where the car is valued at $3,000, for example, a financial benefit is obtained by both the auction provider and auction winner, and entertainment is obtained by the up to about 2000 other people placing bids in this example. In embodiments of the disclosed technology, a user makes multiple bids on respective multiple items that an auction provider exhibits simultaneously, thereby increasing financial intake to the auction provider and excitement for the users.

Figure 4:
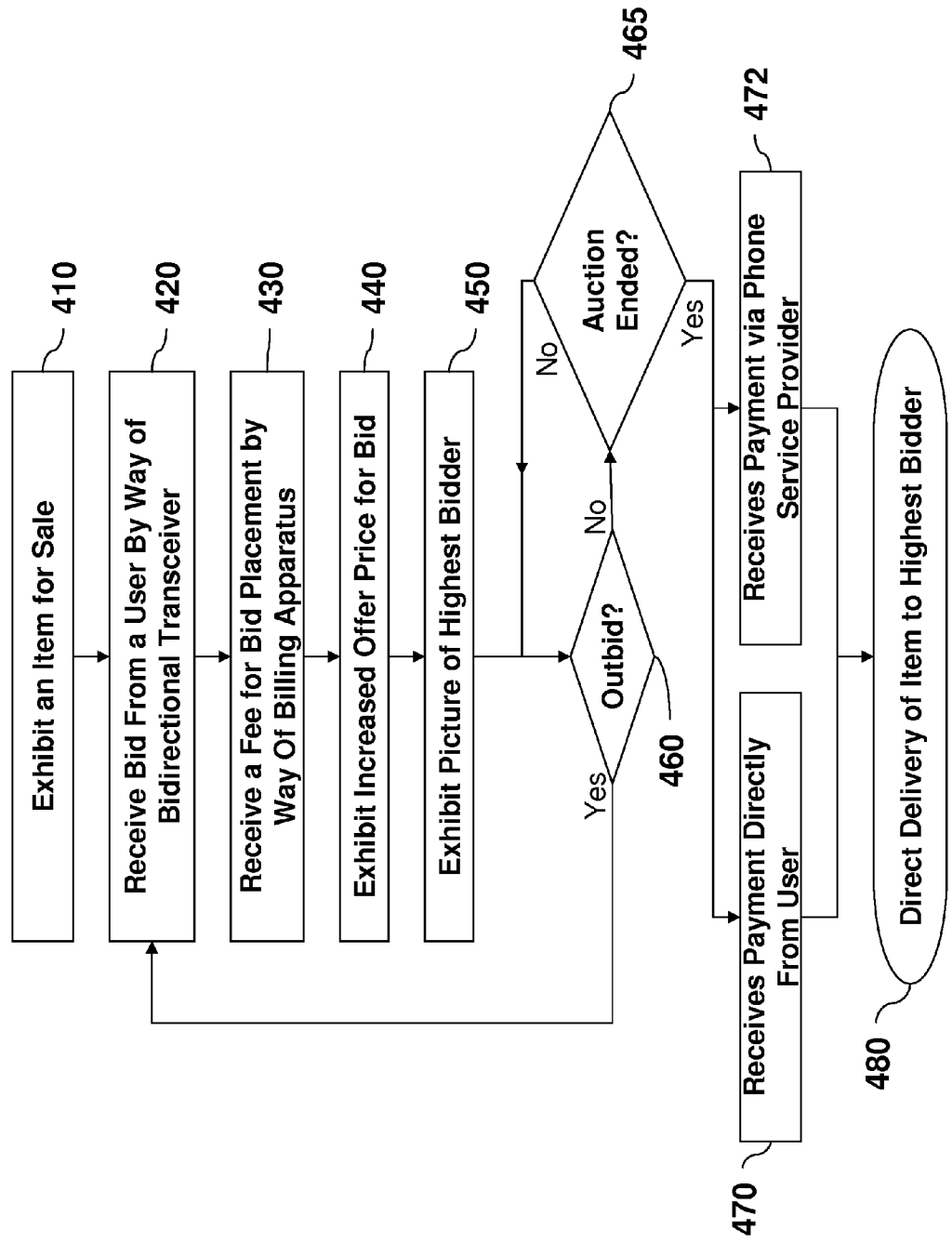
FIG. 4 shows steps carried out by an auction provider in embodiments of the disclosed technology.

FIG. 4 shows steps carried out by an auction provider in embodiments of the disclosed technology. In step 410, an auction provider exhibits an item for sale, such as via a public video display 120. Exhibition of an item for sale is comprised of exhibiting visual, audible, and/or verbal representation of the item, current bid price, current price of bid placement, amount of bids placed, quantity of the item being auctioned, purchasing information (e.g., warranties information, return policies, etc.), retail price, video of a location where the item is being auctioned, other items auctioned and so on.

In step 420, the auction provider receives a bid from a user for an item, such as by way of a bidirectional transceiver 160. The bid received may be one of a plurality of electronic bids for the item received from one or a plurality of handheld devices, such as the handheld device 110 of FIG. 1. Such handheld devices are associated with a phone service plan (as described in FIG. 2) of a user, the user being, until at least the bid is received, unknown to the auction provider. Bids received may be made by use of a premium short messaging device, an interactive voice response system, use of a short messaging device and/or the like. Still further, as part of the auction, bids may be received over a computer network such as the World Wide Web, the internet, live bidding, and so forth. These bids, in combination with the bids received in step 420 may each contribute to the auctioning of an item for sale.

In step 430, the auction provider receives a fee for bid placement by way of a billing apparatus, such as the one shown and described with reference to FIG. 1 and further described with reference to step 240 of FIG. 2. Step 430 may occur at any time after step 420, such as at the end of an auction, in monthly or weekly batches of payments, and so forth. The fee for bid placement is a predetermined payment from a user for placing each bid. The predetermined payment of a fixed amount is determinable based on variables known in the art of auctioning (e.g., amount of time left in the auction, amount of bids placed, bidding price, etc.). The auction provider receives the fee for bid placement, or a portion thereof, from a provider of the phone service plan (directly or by way of a payment processor intermediary, as described above). The provider, in turn, receives the payment from the user whom placed the bid.

In step 440, the auction provider exhibits an increased offer price for a bid, such as on the video display screen 120. This notifies future bidders of the price they must outbid in order to win the auction. In step 450, an auction provider exhibits a picture of the highest bidder, where available. Step 450 is an optional step. Such a picture may be sent by a user bidding from the handheld device (or other device) to the auction provider before, at the time of, or after placing the bid.

In step 460, it is determined if the current highest bidder is outbid, e.g., whether a new higher bid has been received by the auction provider, such as when the auction provider repeats steps 420-460 for a second received bid. As long as the auction has not ended, as determined in step 465, then the cycle of detecting a higher bid in step 460 and determining if the auction has ended in step 465 repeats itself.

Once an auction provider ends an auction, the auction provider (or and/or seller of an item) receives payment for the items auctioned from the user who provided the last/highest bid. Such a payment may be received directly from the user in step 470, such as by conventional payment means between a merchant and buyer (e.g., credit card, check, etc., as described above), or by way of a payment made by the phone service provider in step 472. When step 472 is carried out, the phone service provider passes on the charge to the user as part of the phone service plan and the billing thereof.

In step 480, an auction provider directs delivery of an item to a highest bidder. As mentioned in step 390 of FIG. 3, delivery may be directed to a highest bidder based on information provided by a highest bidder and/or the phone service provider. In further embodiments of the disclosed technology, the auction provider supplies information to the user pertaining to an area of retrieval of the purchased item.

For purposes of illustration and not for limitation, the following example of carrying out an embodiment of the disclosed technology is provided. A user has a personal digital assistant with telephone and data service provided by a phone service provider (e.g., an "iPhone" from Apple Corporation, a "Blackberry" from Research in Motion, Inc., or any other such device). This user receives a monthly invoice sent to her mailing account from her phone service provider for usage of the phone and data service provided. This user pays this invoice via online banking and directly transfers money to the phone service provider for services charged with the phone service plan.

An auction provider 150 auctioneers items at different public locations where people may place bids from a phone or a wireless handheld device. A video of the various bidding locations is cycled through on a portion of a video screen 120 at each bidding location. The aforementioned user may open an application on his or her personal digital assistant (which may require a download or opening a specific mobile website as indicated on the display 120) or call a number displayed on the screen for an interactive voice response system. Using either method/device, an authorization to charge the phone service plan of the user may be obtained (such as by sending a verification to the personal digital assistant (handheld device) to be answered in the affirmative by the user or based on pre-arrangements with a billing provider such as the phone service provider and operator of the network node 170 or an intermediary billing agent).

In this example, the user calls the number used to place a bid where the user is instructed, for example, to press or say 1 to place a bid on a television exhibited at present, or press or say 2 to place a bid on a different object. The interactive voice system then informs the user that the current bid is $210 and to enter a bid amount above this amount. If bidding is incrementing too quickly for this to be effective, the user may simply be instructed to press #, by way of example, to place the next highest bid available and remain on the line until notice is received of being outbid (see steps 260-270, 350, and 460), or that the bid is a winning bid (see steps 280, 370-380, and 470-472). In this manner, fast-paced bidding may be achieved by a person receiving an outbid notice and simply pressing a key (or saying "bid") on his/her handheld device.

Eventually, assuming in this example that the user has placed 26 bids for 99 cents each, the user is charged (see step 230) $25.74 for the bids placed. The phone service provider (and/or billing intermediary) may keep, for example, 10 cents for each bid or a flat fee of $2.50 for the session, and the auction provider receives the rest. When hundreds of bids are placed, an item can be sold at a substantial discount on its value, the difference being made up by the fees for placing bids.

Figure 5:
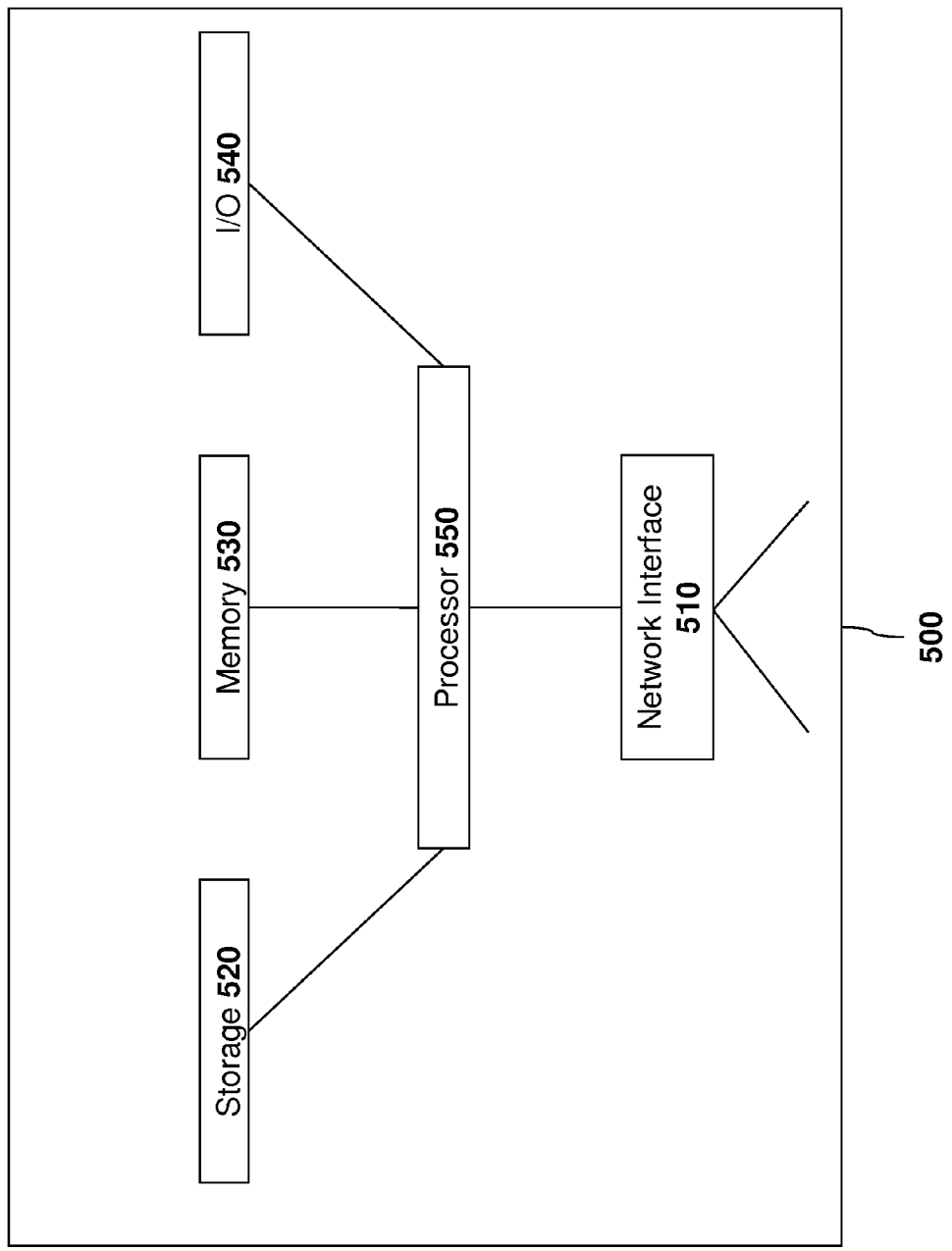
FIG. 5 shows a high-level block diagram of a device on which aspects of the disclosed technology may be carried out.

FIG. 5 shows a high-level block diagram of a console that may be used to carry out the invention. Console 500 comprises a processor 550 that controls the overall operation of the computer by executing the console's program instructions which define such operation. The console's program instructions may be stored in a storage device 520 (e.g., magnetic disk, database) and loaded into memory 530 when execution of the console's program instructions is desired. Thus, the console's operation will be defined by the console's program instructions stored in memory 530 and/or storage 520, and the console will be controlled by processor 550 executing the console's program instructions. A console 500 also includes one or a plurality of input network interfaces for communicating with other devices via a network (e.g., the internet). A console 500 also includes one or more output network interfaces 510 for communicating with other devices. Console 500 also includes input/output 540 representing devices which allow for user interaction with the computer 500 (e.g., display, keyboard, mouse, speakers, buttons, etc.). One skilled in the art will recognize that an implementation of an actual console will contain other components as well, and that FIG. 5 is a high level representation of some of the components of such a console for illustrative purposes. It should also be understood by one skilled in the art that the method and devices depicted in FIGS. 1 through 4 may be implemented on a device such as is shown in FIG. 5.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

We claim:

1. A device for providing phone and data service comprising:
   a bidirectional transceiver providing said phone and data service to a handheld device; and
   billing means configured to charge a user of said handheld device for use of said phone and data service;
   wherein, by way of said transceiver, when said user places a bid for an item exhibited by an auction provider, said user is charged for bid placement and a portion of said charge is forwarded to said auction provider; and
   wherein at least some of said users are previously unknown to said auction provider.

2. The device of claim 1, wherein said user is previously unknown to said auction provider.

3. The device of claim 1, wherein said user places said bid using a premium short messaging service.

4. The device of claim 1, wherein said user places said bid using an interactive voice response system.

5. The device of claim 4, further comprising a second user placing a bid and said second user uses a short messaging service to place said bid.

6. The device of claim 5, wherein said second user's bid is the highest bid in said auction, and said billing means charge a second user of said handheld device for at least an amount of said bid.

7. The device of claim 5, wherein said user's bid is the highest bid in said auction, and said transceiver receives data from said handheld device comprising billing information used to pay said bid.

8. The device of claim 1, wherein said auction is provided on a public video display.

9. The device of claim 8, wherein a video of a location for viewing said public video display is exhibited with said item for sale.

10. The device of claim 8, wherein a picture of a highest bidder is exhibited with said item.

11. A method for an auction provider to auction an item, comprising:
    exhibiting an item for sale;
    receiving a plurality of electronic bids for said item from a plurality of handheld wireless devices, wherein each said handheld wireless device is associated with a phone service plan of a user and at least some of said users are previously unknown to said auction provider;
    receiving a predetermined payment for each bid placed, said payment charged by a provider of said phone service plan; and
    directing delivery of said item to said user.

12. The method of claim 11, wherein said auction provider receives a bid placed by said user by use of a premium short messaging service.

13. The method of claim 11, where said auction provider receives a bid placed by said user by use of an interactive voice response system.

14. The method of claim 13, further comprising said auction provider receiving a bid provided by a second user by use of a short messaging service.

15. The method of claim 14, wherein said second user's bid is the highest bid in said auction, and said billing means charge a user of said handheld device for at least an amount of said bid.

16. The method of claim 14, wherein said second user's bid is the highest bid in said auction, and said auction provider receives data from said handheld device comprising billing information used to charge said bid.

17. The method of claim 14, wherein said auction provider exhibits said auction on a public video display.

18. The method of claim 17, wherein a video of a location for viewing said public video display is exhibited with said item for sale.

19. The method of claim 17, wherein a picture of a highest bidder is exhibited with said item.

20. The method of claim 11, further comprising a step of receiving a payment for a highest bid amount by way of said phone service provider.

* * * * *